(12) United States Patent
Cassanova

(10) Patent No.: US 8,351,577 B2
(45) Date of Patent: Jan. 8, 2013

(54) METHODS, SYSTEMS AND COMPUTER PRODUCTS FOR VIDEO CALLING AND LIVE HELP VIA IPTV

(75) Inventor: Jeffrey Cassanova, Villa Rica, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1588 days.

(21) Appl. No.: 11/773,095

(22) Filed: Jul. 3, 2007

(65) Prior Publication Data

US 2009/0009586 A1 Jan. 8, 2009

(51) Int. Cl.
*H04M 1/24* (2006.01)

(52) U.S. Cl. .................................. 379/1.01; 348/14.04

(58) Field of Classification Search ............... 348/14.04; 379/88.13, 1.01, 9.03, 9.02, 10.01, 27.01, 379/27.02, 27.03, 28, 32.01
See application file for complete search history.

(56) References Cited

U.S. PATENT DOCUMENTS

| 5,678,002 | A * | 10/1997 | Fawcett et al. ................ 715/709 |
| 6,668,044 | B1 * | 12/2003 | Schwartz et al. ............... 379/68 |
| 7,127,506 | B1 * | 10/2006 | Schmidt et al. ................ 709/224 |
| 8,006,121 | B1 * | 8/2011 | Samoilova et al. ................ 714/2 |
| 8,078,670 | B2 * | 12/2011 | Owhadi et al. ................ 709/203 |
| 2004/0019691 | A1 * | 1/2004 | Daymond et al. ............. 709/231 |
| 2007/0050836 | A1 * | 3/2007 | Stanek et al. ................. 725/131 |
| 2007/0100782 | A1 * | 5/2007 | Reed et al. ........................ 707/1 |
| 2008/0022336 | A1 * | 1/2008 | Howcroft et al. ............. 725/100 |

* cited by examiner

*Primary Examiner* — Olisa Anwah
(74) *Attorney, Agent, or Firm* — Cantor Colburn LLP

(57) ABSTRACT

Systems, methods and computer products for querying for an interactive assistant for communication over a network via the set-top box. Communications are initiated between a subscriber and an interactive assistant. A diagnostic data log is uploaded from the set-top box to the interactive assistant. Based on the communications between the subscriber an interactive assistant and the diagnostic data log, diagnostic protocols are executed within the set-top box to generate a diagnostic report. The interactive assistant provides feedback analytics via the set-top box based on the communications between the subscriber and the interactive assistant, the diagnostic data log and the diagnostic report. Firmware solutions are downloaded to the set-top box based on results from the diagnostic report.

16 Claims, 3 Drawing Sheets

Flow Diagram

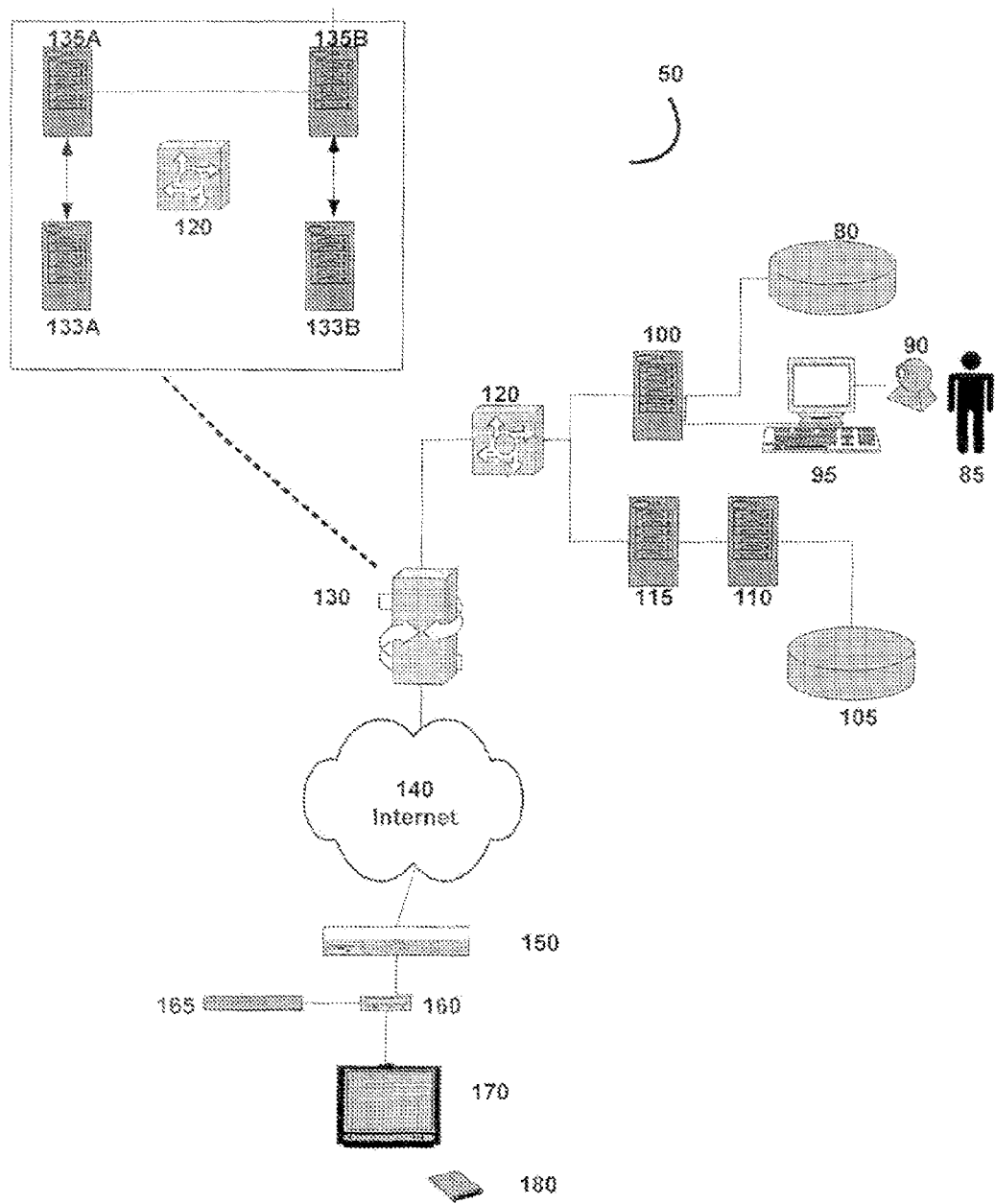
FIGURE 1: IPTV Interactive Network

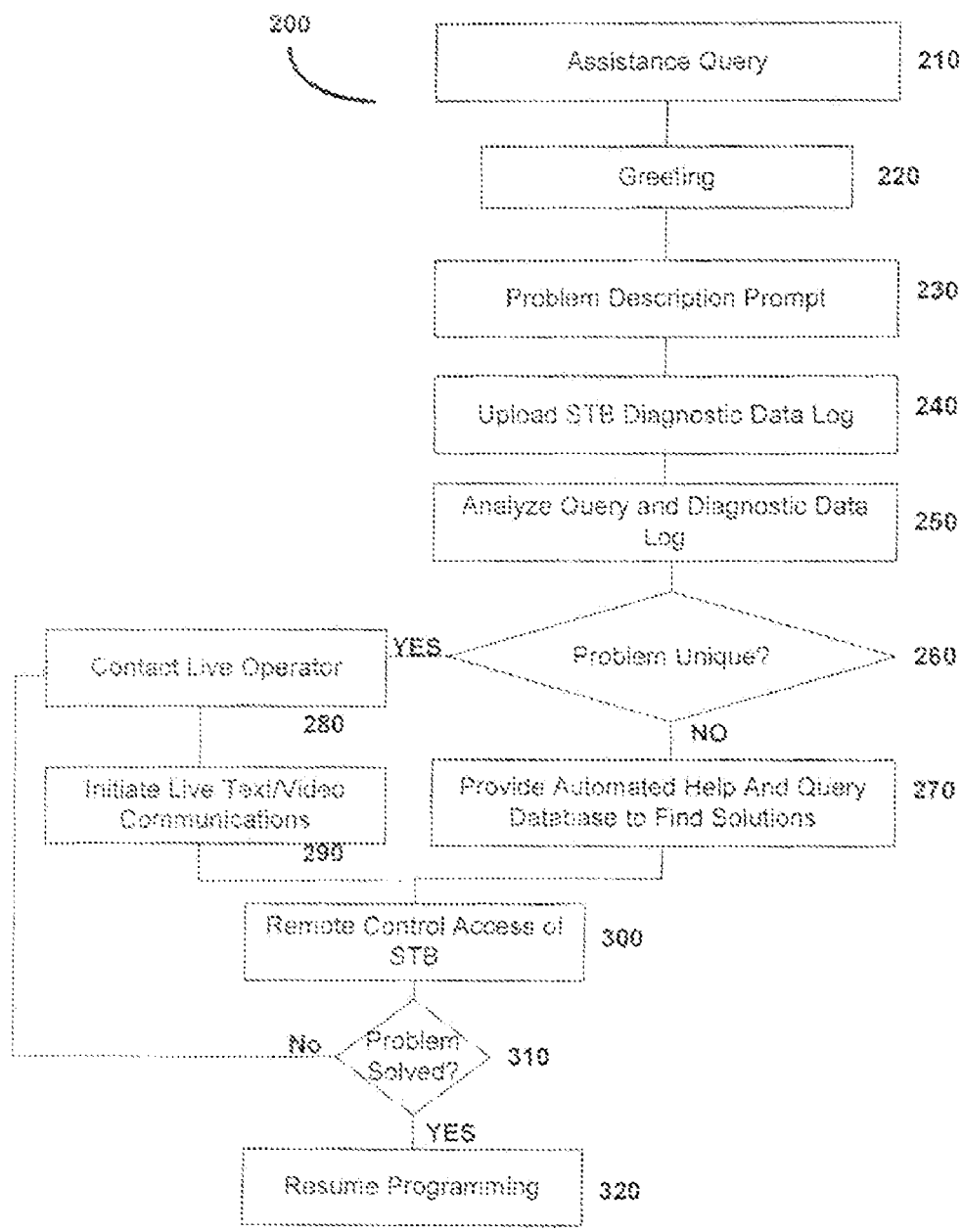
FIGURE 2: Flow Diagram

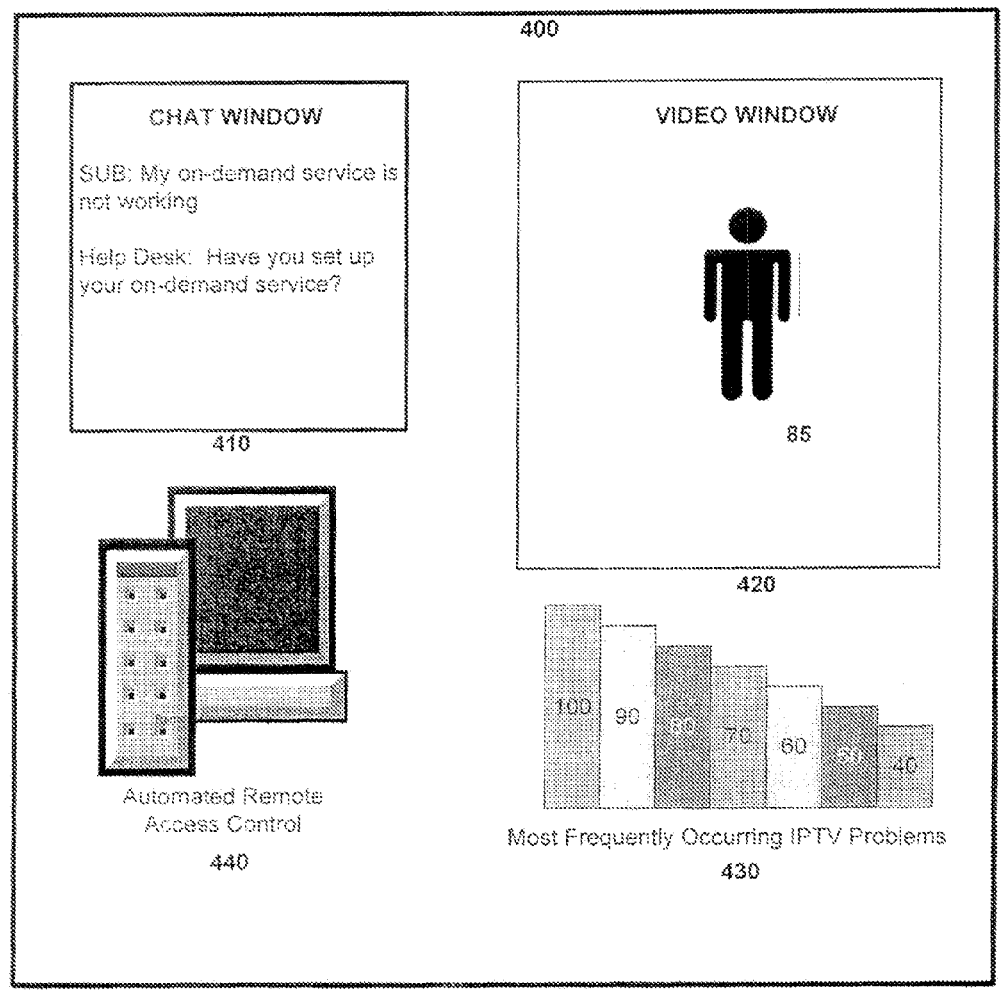
FIGURE 3: STB Graphical User Interface

METHODS, SYSTEMS AND COMPUTER PRODUCTS FOR VIDEO CALLING AND LIVE HELP VIA IPTV

BACKGROUND OF THE INVENTION

1. Field of the Invention

The present invention relates generally to online electronic help systems and more particularly, to an online user interface featuring live video for assisting a subscriber in correcting problems with their electronic devices.

2. Description of Background

Internet protocol television (IPTV) is a digital television delivery service wherein the digital television signal is delivered to residential users via a computer network infrastructure using the internet Protocol (IP). Typically, IPTV services are bundled with additional Internet services such as Internet web access and voice over Internet protocol (VOIP). In exemplary embodiments, a user accesses playback IPTV operations through a set top box (STB) connected to their television for the reception of a digital signal. Used in conjunction with an IP-based platform, a STB allows for a user to access an IPTV service and any additional services that are integrated within the IPTV service.

IPTV service platforms allow for an increase in the interactive services that can be provided to residential user. As such, a user can have access to a wide variety of content, that is available via the IPTV service or the Internet. Unfortunately, there is a learning curve for subscribers using these services. Printed and online manuals are often insufficient for helping subscribers solve problems associated with their STBs. Furthermore, phone calls to subscriber help lines are often not sufficient as the subscriber may be required to describe the problem in technical terms that the help desk assistant can understand. If subscribers are not skilled in the related technology area, they may have difficulty relaying their problems and concerns to the help desk assistant.

What is needed is a method operable over a STB for assisting a subscriber in solving problems with electronics in real time. There exists a need for a system providing a subscriber with live feedback of the progress of solutions used to solve problems with their STBs. There also exists a need to automatically keep a log of previous problems related to a particular subscriber's STB.

As discussed above, current online and phone based help lines fail to provide method of assisting subscribers with their electronic problems in real time and recording that assistance for playback at a later time. Therefore, there exists a need for a solution to provide live help assistance and feedback to subscribers in real time.

BRIEF SUMMARY

Exemplary embodiments include provision of a method for providing interactive communications. The method comprises establishing a communications network between an interactive assistant in a help desk server and a communications device. The method further comprises receiving a service request sent from a subscriber operating the communications device to the interactive assistant. In response, the interactive assistant uploads a diagnostic data log from the communications device. The interactive assistant then services the communications device via the network based on analysis within the interactive assistant of the service request and the diagnostic data log wherein the servicing is fulfilled in an automated process if the service request is common and the servicing is provided in a direct interactive process if the service request is unique.

Further exemplary embodiments include a computer readable medium for providing automated interactive communications. The computer readable medium comprises including instructions for causing a computer to implement a method, the method comprising establishing communication over a network between an automated interactive assistant and a set-top box operated by a subscriber. The automated interactive assistant receives a service request sent from the subscriber operating the set-top box. The automated interactive assistant then uploads a diagnostic data log via the network from the set-top box. The automated interactive assistant then analyzes the service request to determine if the service request can be fulfilled with an automated process wherein a positive service profile is generated if the service request is common and a negative service profile is generated if the service request is unique. Feedback analytics and interactive assistance is provided from the automated interactive assistant to the subscriber via the set-top box based on the positive service profile and the diagnostic data log. The automated interactive assistant transmits via the network, and executes within the set-top box diagnostic protocols in response to a positive service profile to generate a diagnostic report. The automated interactive assistant also transmits firmware solutions to the set-top box based on the positive service profile, the diagnostic data log and the diagnostic report.

Additional exemplary embodiments include a system for facilitating live interactive communications via a set-top box device. The system comprises a help desk server capable of two-way communications with a set-top box over a network and a live help application responding on the help desk server, the live help application having instructions to: enable communications between an interactive assistant provided, by the help desk server and a subscriber operating the set-top box, wherein the help desk server and the interactive assistant receive a service request from tire subscriber. The live help application also having instructions to: upload a diagnostic data log from the set-top box in response to the service request, and generates a diagnostic report using the diagnostic data log and the service request. The live help application has instructions to: analyze the diagnostic report to determine if the service request can be fulfilled using an automated process wherein a positive service profile is generated if the service request is common and a negative service profile is generated if the service request is unique. The live help application has instructions to: provide feedback analytics and interactive assistant to the subscriber via the set-top box based on the diagnostic report and the positive service profile or the negative service profile. Finally the live help application has instructions to: transmit firmware solutions to the set-top box based on the positive service profile or the negative service profile and the diagnostic report.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 1 illustrates an exemplary embodiment of a system for a network providing live, Interactive communications to a subscriber in an IPTV environment.

FIG. 2 is a flow diagram detailing aspects of a methodology for providing live Interactive communications with a help server in an IPTV environment in accordance with exemplary embodiments.

FIG. 3 illustrates aspects of a graphical user interface for facilitating live interactive communications with a help server in an IPTV environment in accordance with exemplary embodiments.

The detailed description explains the exemplary embodiments, together with advantages and features, by way of example with reference to the drawings.

DETAILED DESCRIPTION OF EXEMPLARY EMBODIMENTS

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Exemplary embodiments include systems and methods for receiving within an IPTV environment a live, interactive, video message—in addition to any image or audio/video attachments to the message—from a remote help desk server for interaction and display within the IPTV environment. Exemplary embodiments include the architecture of an IPTV gateway, wherein the IPTV gateway is responsible for providing interactive IPTV services to an IPTV subscriber and responding to IPTV help desk assistance requests from, a user of the IPTV subscription. An IPTV help desk assistance request can be in the form a help button on a remote control for the IPTV STB, a text message, a chat message, a phone call to the help desk, etc. For example, the user may press a help button on the remote control to prompt the STB to generate a "pop-up" help window displayed on a television, display device or any other conventional message notification scheme. Further, the IPTV gateway provides an archival history of the help requests to the IPTV subscriber.

In exemplary embodiments, the IPTV gateway interfaces over a communications network with an IPTV distribution center to receive content directed to an IPTV subscriber. Additionally, the IPTV gateway interfaces with a preferences component, wherein the preferences component is responsible for handling the preferences for an IPTV system as dictated by the desires of an IPTV subscriber. Further, the IPTV gateway is responsible for retrieving an IPTV subscriber's preferences and input requests for each IPTV STB that is associated with the IPTV subscriber.

For each STB that is configured to retrieve interactive help desk assistance information, the IPTV gateway interacts with an IPTV infrastructure to accomplish the actual transmittal of the live, interactive help desk assistance to the requesting STB. Further, all help desk assistance requests that are generated within the system are saved to a log at the IPTV gateway. As a further feature, IPTV subscribers can view a listing of the most frequently occurring subscriber help desk assistance requests via a log displayed on their display device via an application that runs on the STB that is in communication with the display device.

Turning to the drawings in greater detail, it will be seen that FIG. 1 illustrates aspects of a system providing an interactive help desk assistance requests via messages within, an IPTV environment that may be implemented in accordance with exemplary embodiments. As illustrated in FIG. 1, the IPTV system 50 includes an IPTV gateway 130, wherein the IPTV gateway 130 further comprises a primary front-end processing system 133A that is in communication with a primary back-end processing system 135A. The primary back-end processing system 135A is in former communication with a media distribution system 120. In exemplary embodiments, a redundant secondary front-end 133B and a secondary back-end processing system 135B are incorporated within the IPTV gateway 130. The secondary front-end 133B and back-end 135B processing systems are configured to be operational only in the event of the failure of the primary processing system (133A, 135A) that corresponds to the secondary processing system (133B, 135B).

The back-end processing system 135A of the IPTV gateway 130 is interfaced with a media distribution system 120. The media distribution system 120 is interfaced with a media encoder server 115 and a preferences component 110. The preferences component 110 is configured to handle the IPTV preferences that have been selected by an IPTV subscriber. The preferences component is operatively coupled to a content database 105 storing IPTV subscriber preferences on a STB basis. The back-end processing system 135A of the IPTV gateway 130 is also interfaced with a help desk server 100. In operation, the help desk server 100 can be further networked with a PSTN network; wherein video chat request messages received that are received from a STB 160 are initially are received at a router 150 and forwarded to a communications network 140 (e.g. Internet, etc.) aid on to the IPTV gateway 130 and thereafter routed to the help desk server 100, media encoder server 115 and a preferences component 110.

The IPTV system 50 is designed so that a subscriber operating the STB 160 either directly or with a remote control device 180 can press a button to receive interactive help assistance. In exemplary embodiments, when the subscriber presses a help button on the remote control device 180, an interactive help assistance request is sent from the STB 160 over the communications network 140 and routed to the help desk server 100. Pot example, as illustrated in FIG. 2, the flow diagram illustrates an IPTV system methodology 200 that initially responds to the help assistance request at step 210 with an automated greeting at step 220 and prompts the subscriber to describe the problem the subscriber wants addressed at step 230. In exemplary embodiments, the prompt for the problem description at step 230 may be presented in the form of a common chat, message window 410 (as illustrated in FIG. 3).

Once the user enters the problem description, the IPTV system methodology 200 uploads a diagnostic data log at step 240 from the STB 160 and at step 250 analyzes the problem description at step 230 along with the diagnostic data log shown in step 240 to determine if the request is unique or common at step 260, as shown in FIG. 2. If the system determines that the problem, is common to a number of subscribers, the system may query a database in the help desk server 100 to down load at step 270 automated help systems or a video or text log containing detailed instructions for solving the subscriber's help request. In exemplary embodiments, automated macros may be downloaded to the STB 160 gaining remote access control of the STB 160 to correct, problems and/or adjust settings on the device. The subscriber in then prompted to determine if the automated help at step 270 solved their problem with the STB 160. If the video or text log presented at step 270 did not answer the subscriber's questions, the subscriber may be forwarded to a live help assistant at step 280. Similarly, if system determines the subscriber's original help request is unique at step 260, foe system also forwards the unique request to the live help assistant at step 280.

As shown in FIGS. 1 and 2, the live help assistant may be a human being 85 or an automated system designed to assist the subscriber, if the live help assistant is a human being 85 the live help assistant may activate a web camera 90 that is focused on the person 85 to initiate a live video chat session 410, 420 with the subscriber as shown in FIGS. 1 and 3. Here the live help assistant may interact with the subscriber to determine the subscriber's help needs. In one embodiment a live video 420 of the human being 85 appears in a window 420 and is displayed on the display screen 170, as shown in FIG. 3. This allows the subscriber to view the live help assistant in real time.

Once the live help assistant understands the subscriber's needs, the live help assistant can prompt the subscriber to allow the live help assistant to gain remote control and access over the subscriber's STB 160 to install software, update settings and/or to address problems with the subscriber's system. While the live help assistant has control of the subscriber's system, the live help assistant can also guide the subscriber through various processes on the STB 160 so that the subscriber learns how to address problems with the STB 160 on their own. In still another embodiment, the IPTV system 50 records the interactive chat session and stores it in a memory 80 so that the subscriber can access it for future reference.

In exemplary embodiments, while the live help assistant is assisting the subscriber with problems with their IPTV, the chat assistant may hold a voice conversation with the subscriber using VOIP technology, cellular technology, or standard packet-switched telephone network (PSTN) technology. The system may record the voice conversations to allow playback of the conversation by the subscriber for future reference. Either the subscriber or the live help assistant can initiate the voice conservations.

When the subscriber initially prompts the live help assistant for assistance with a problem, the IPTV system methodology 200 automatically uploads a diagnostic data log 165 at step 240 stored in a memory of the STB 160. The diagnostic data log 165 contains a record of performance parameters, error logs, updates and any locally made changes generated during operation, of the STB 160. The system 100 uses the diagnostic data log 165 to perform an analysis of potential problems with the subscriber's STB 160, The diagnostic log 165 also allows the live help assistant to trouble shoot any problems with the subscribers STB 160. The live help assistant can also use automated troubleshooting tools that automatically use the diagnostic log 165 to determine problems with the STB 160 and provide suggestions and scenarios for correcting certain problems.

In exemplary embodiments, the automated trouble shooting tools 440 replace the human being 85 to become the live help assistant. The automated trouble shooting tools 440 operate through the graphical user interlace 400 displayed on the subscriber's display 170 via the STB 160. Similar to the human live help assistant, these trouble shooting tools 440 acting as the live help assistant prompts the user to allow remote control of their STB 160, these trouble shooting tools may then operate the STB 160 remotely and guide the subscriber through a series of scenarios addressing problems and issues with the subscriber's STB 160. As explained previously, these help sessions may be recorded for future reference by the subscriber.

In exemplary embodiments, as shown in FIG. 3, the graphical user interface 400 displayed on the subscribers display 170 via the STB 160 may also provide a live or recorded problem tracker 430. In one embodiment, a live problem tracker 430 is displayed and tracks in real-time the most commonly occurring problems with subscriber's STBs 160. These statistics may be polled from a number of factors including a subscriber's geographical region; the type of STB 160 the subscriber has; the programming the subscriber is watching; the network the subscribe uses; and arty other relevant factors. This feature allows a subscriber to immediately discern if the problem is local to their STB 160 or if it is something that is occurring beyond the subscriber's walls.

The problem tracker 430 also allows the IPTV system methodology 200 to immediately discern if the problem is unique to the subscriber or something that in commonly occurring. If the problem is commonly occurring among a number of subscribers, automated trouble shooting tools are generated to address the problem. In exemplary embodiments, these automated trouble shooting tools 440 prompt the subscribers in a live help window 410, 440 to allow remote control of the subscriber's STB 160. Once authorized, the automated trouble shooting tools 440 may send individualized or a mass broadcast procedures for correcting problems with subscribers STBs 160.

In exemplary embodiments, the automated trouble shooting tools 440 may upload diagnostic logs 165 from a plurality of STBs 160 to determine areas requiring repair, updating or improvement. Software or firmware updates are then automatically uploaded to the plurality of STBs 160 using the automated trouble shooting tools 440.

In the exemplary embodiments, the live help assistant 280 may be a human being 85, an on demand video or a set of automated trouble shooting tools 440 designed to interact with and assist a subscriber in solving problems associated with their STB 160 and IPTV system 50. In exemplary embodiments, the live help aspect of the system comes into play as the system interactively assists the subscriber in solving their STB 160 problem in "real-time." This live real-time help may come in the form of a live human being 85 having a conversation with the subscriber via a live chat, voice conversation, text messaging, video chat 420, etc. The live real-time help may also occur when either the human being 85 or the automated trouble shooting tools 440 operates the subscriber's STB 160 remotely to correct problems with the STB 160. Finally, the live, real-time help may come in the form of an on-demand or a mass broadcast video instructing subscribers about how to correct and update their STB 160 device.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments failing within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for providing interactive communications, the method comprising:
    establishing communications between an interactive assistant in a help desk server and a communications device via a communications network;
    receiving a service request sent from a subscriber operating the communications device to the interactive assistant;
    receiving a diagnostic data log to the interactive assistant from the communications device; and
    servicing the communications device via the communications network by the interactive assistant based on analysis within the interactive assistant of the service request and the diagnostic data log;
    wherein the servicing is fulfilled in an automated process when the service request is common and the servicing is provided in a direct interactive process when the service request is unique;
    wherein the interactive assistant is an automated computer program that analyzes communications of the subscriber, the diagnostic data log, and a diagnostic report to determine various pre-recorded presentations for correcting problems with the communications device of the subscriber; and
    wherein the various pre-recorded presentations are on-demand video presentations demonstrating methods for correcting the problems of the communications device of the subscriber.

2. The method according to claim 1, further comprising receiving a query from the interactive assistant for permission to allow remote access control of the communications device.

3. The method according to claim 2, wherein the interactive assistant acquires remote access control of the communications device to guide the subscriber through an interactive session with scenarios for correcting the problems within the communications device.

4. The method according to claim 3, wherein a session recorder records the interactive session for later playback by the subscriber.

5. The method according to claim 1, wherein the various pre-recorded presentations comprise an automated trouble shooting tool acquiring remote access control of the communications device to perform a process for operating the communications device to:
    perform properly;
    upload firmware; and
    provide information demonstrating how the subscriber should correct the problems with the communications device.

6. A non-transitory computer readable medium providing automated interactive communications, the non-transitory computer readable medium comprising including instructions for causing a computer to implement a method, the method comprising:
    establishing communication over a network between an automated interactive assistant and a set-top box operated by a subscriber;
    receiving a service request sent from the subscriber operating the set-top box to the automated interactive assistant;
    receiving a diagnostic data log to the automated interactive assistant via the network from the set-top box;
    analyzing the service request within the automated interactive assistant to determine when the service request can be fulfilled with an automated process wherein a positive service profile is generated when the service request is common and a negative service profile is generated when the service request is unique;
    providing feedback analytics and interactive assistance from the automated interactive assistant to the subscriber via the step-top box based on the positive service profile and the diagnostic data log;
    transmitting from the automated interactive assistant via the network, and executing within the set-top box, diagnostic protocols in response to the positive service profile to generate a diagnostic report; and
    transmitting firmware solutions from the automated interactive assistant to the set-top box based on the positive service profile, the diagnostic data log, and the diagnostic report;
    wherein the automated interactive assistant analyzes the positive service profile, the negative service profile, the diagnostic data log, and the diagnostic report to determine various pre-recorded presentations for correcting problems of the set-top box; and
    wherein the various pre-recorded presentations are on-demand video presentations demonstrating methods for correcting the problems of the set-top box of the subscriber.

7. The computer readable medium according to claim 6, wherein the automated interactive assistant queries the subscriber for permission to allow remote access control of the set-top box.

8. The computer readable medium according to claim 7, wherein the automated interactive assistant acquires remote access control of the set-top box to guide the subscriber through an interactive session with scenarios for correcting the problems within the set-top box.

9. The computer readable medium according to claim 8, wherein a session recorder records the interactive session for later playback by the subscriber.

10. The computer readable medium according to claim 6 wherein the various pre-recorded presentations include a process wherein the automated interactive assistant acquires remote access control of the set-top box to perform a process for configuring the set-top box to:
    perform properly;
    upload firmware; and
    provide information demonstrating how the subscriber should correct the problems with the set-top box.

11. A system for facilitating live interactive communications, the system comprising:

a help desk server capable of two-way communications with a set-top box over a network;

a live help application responding on the help desk server, the live help application having instructions to:

enable communications between an interactive assistant provided by the help desk server and a subscriber operating the set-top box, wherein the help desk server and the interactive assistant receive a service request from the subscriber;

receive a diagnostic data log from the set-top box in response to the service request and generate a diagnostic report using the diagnostic data log and the service request;

analyze the diagnostic report to determine when the service request can be fulfilled using an automated process wherein a positive service profile is generated when the service request is common and a negative service profile is generated when the service request is unique;

provide feedback analytics and interactive assistance to the subscriber via the set-top box based on the diagnostic report and the positive service profile when generated and the negative service profile when generated; and transmit firmware solutions to the set-top box based on the positive service profile when generated and the negative service profile when generated and the diagnostic report;

wherein the interactive assistant is an automated computer program that analyzes communications of the subscriber, the diagnostic data log, and the diagnostic report to determine various pre-recorded presentations for correcting problems with the set-top box of the subscriber; and wherein the various pre-recorded presentations are on-demand video presentations demonstrating methods for correcting the problems of the set-top box of the subscriber.

12. The system according to claim 11, wherein diagnostic protocols are transmitted from the help desk server for execution within the set-top box in response to the positive service profile to generate the diagnostic report.

13. The system according to claim 11, wherein the negative service profile prompts the help desk server to initiate the two-way communications with a live help desk assistant for communications with the subscriber via the set-top box.

14. The system according to claim 13, wherein the live help desk assistant queries the subscriber for permission to allow remote access control of the set-top box.

15. The system according to claim 12, wherein an automated help desk assistant acquires remote access control of the set-top box to guide the subscriber through an interactive session with scenarios for correcting the problems within the set-top box.

16. The system according to claim 15, wherein a session recorder records the interactive session for later playback by the subscriber.

* * * * *